(12) United States Patent
Heidel et al.

(10) Patent No.: US 9,858,310 B2
(45) Date of Patent: Jan. 2, 2018

(54) MAINTAINING IN-MEMORY DATABASE CONSISTENCY BY PARALLELIZING PERSISTENT DATA AND LOG ENTRIES

(71) Applicant: SAP SE, Walldorf (DE)

(72) Inventors: Martin Heidel, Walldorf (DE); Ivan Schreter, Malsch (DE); Joern Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 268 days.

(21) Appl. No.: 14/853,260

(22) Filed: Sep. 14, 2015

(65) Prior Publication Data

US 2017/0075943 A1  Mar. 16, 2017

(51) Int. Cl.
*G06F 17/00* (2006.01)
*G06F 17/30* (2006.01)

(52) U.S. Cl.
CPC .. *G06F 17/30368* (2013.01); *G06F 17/30371* (2013.01)

(58) Field of Classification Search
CPC ................................................. G06F 17/30371
USPC .......................................................... 707/615
See application file for complete search history.

(56) References Cited

U.S. PATENT DOCUMENTS

| 7,065,537 | B2* | 6/2006 | Cha | G06F 11/1471 707/648 |
| 9,235,769 | B2* | 1/2016 | Oro Garcia | G06K 9/00973 |
| 9,251,214 | B2* | 2/2016 | Diaconu | G06F 17/30501 |
| 2010/0162247 | A1* | 6/2010 | Welc | G06F 9/466 718/101 |
| 2011/0087633 | A1* | 4/2011 | Kreuder | G06F 17/30578 707/610 |
| 2013/0117234 | A1* | 5/2013 | Schreter | G06F 17/30368 707/674 |
| 2013/0117237 | A1* | 5/2013 | Thomsen | G06F 17/30377 707/683 |
| 2014/0149697 | A1* | 5/2014 | Thomsen | G06F 11/004 711/162 |

OTHER PUBLICATIONS

Chen, Yi, et al., "Pipelined Multi-GPU MapReduce for Big-Data Processing", Computer and Information Science (SCI), vol. 493, Springer International Publishing, Switzerland, © 2013, pp. 231-246.*
Rafique, M. Mustafa, et al., "A capabilities-aware framework for using computational accelerators in data-intensive computing", Journal of Parallel and Distributed Computing, vol. 71, Issue 2, Feb. 2011, pp. 185-197.*
Cheng, Yu, et al., "GLADE: Big Data Analytics Made Easy", SIGMOD '12, Scottsdale, AZ, May 20-24, 2012, pp. 697-700.*

* cited by examiner

*Primary Examiner* — Robert Stevens
(74) *Attorney, Agent, or Firm* — Mintz Levin Cohn Ferris Glovsky and Popeo, P.C.

(57) ABSTRACT

A database operation is initiated in an in-memory database that stores persistent data in a secondary storage and has at least one associated log. The database operation involves data having a size above a pre-defined threshold. Thereafter, the data is split into a plurality of chunks and the database operation is executed by parallelizing each chunk over a plurality of hierarchically arranged threads. Related systems, apparatus, methods and computer program products are also described.

20 Claims, 4 Drawing Sheets

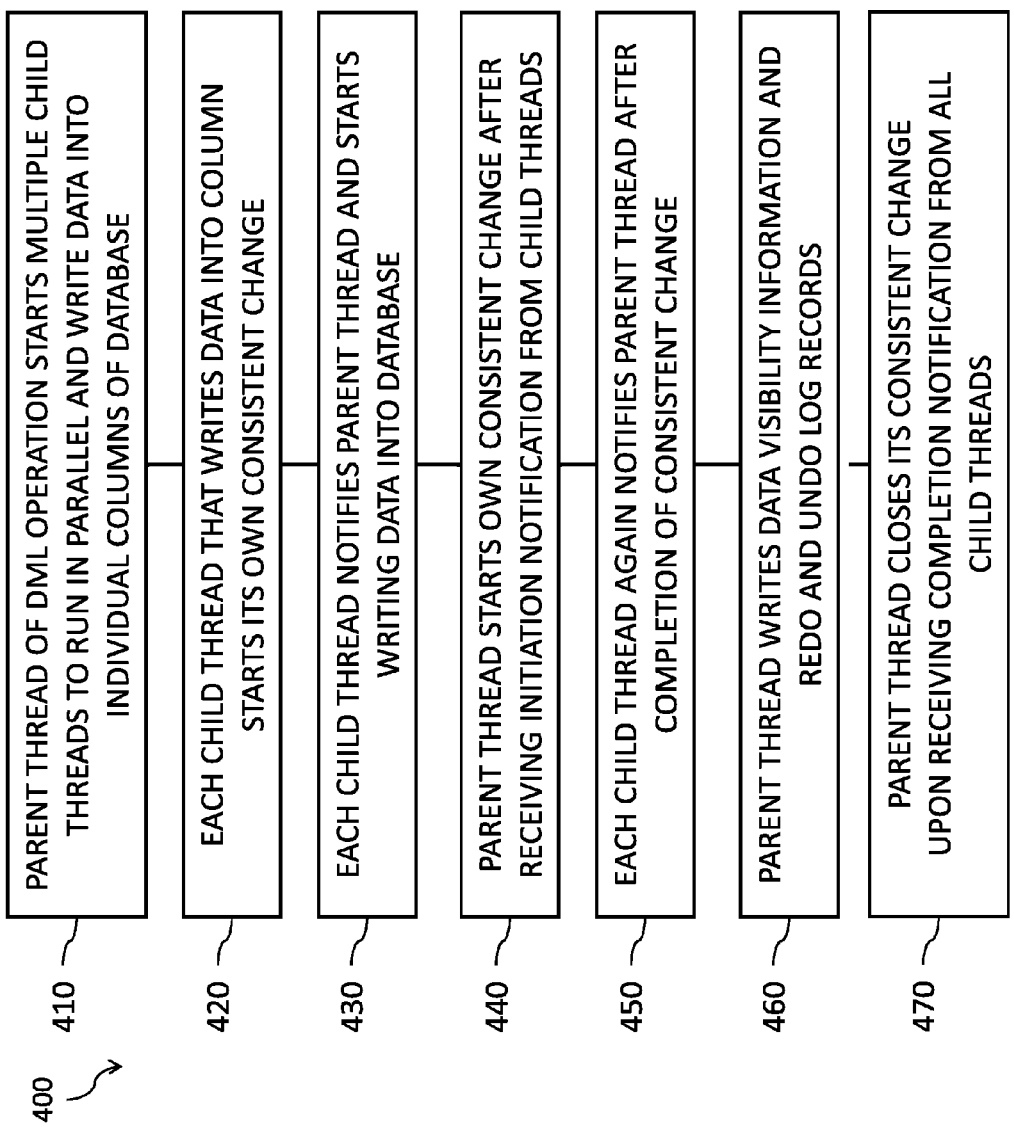

MAINTAINING IN-MEMORY DATABASE CONSISTENCY BY PARALLELIZING PERSISTENT DATA AND LOG ENTRIES

TECHNICAL FIELD

The subject matter described herein relates the parallelization of consistent changes for persisting data and log entries by splitting data into chunks for processing by hierarchies of threads.

BACKGROUND

Databases implement consistent views to ensure that uncommitted data from other users is not accessible. Locking and other mechanisms can be utilized by databases to ensure that any changes to the data stored within the database are consistent. Further, changes to the database can be logged in a log to allow operations/transactions to be undone and/or redone if required to maintain consistency. Changes affecting numbers rows/columns of a database table can affect overall performance of the database as they require significant processing resources in order to maintain consistency and can slow the execution of corresponding database operations.

SUMMARY

In one aspect, a database operation is initiated in an in-memory database that stores persistent data in a secondary storage and has at least one associated log. The database operation involves data having a size above a pre-defined threshold. Thereafter, the data is split into a plurality of chunks and the database operation is executed by parallelizing each chunk over a plurality of hierarchically arranged threads.

For each chunk, (i) a parent thread causes each of a plurality of child threads to execute a corresponding consistent change, (ii) the child threads each notify the parent thread when they have started their corresponding consistent change, (iii) the parent thread starts its own consistent change upon receiving the notifications from all of the child threads that they have started their corresponding consistent change, (iv) the parent thread, as part of its consistent change, then writes visibility information and undo and redo log entries in the log, (v) the child threads each notify the parent thread when they have completed their corresponding consistent change, and (vi) the parent thread closes its consistent change upon receiving the notifications from all of the child threads that they have completed their corresponding consistent change.

The in-memory database can be a column-oriented in-memory database that stores data tables as sections of columns of data rather than as rows of data.

In some variations, there can be one child thread per column of data being affected by the database operation. In other variations, there can be less than one child thread per column of data being affected by the database operation.

The database operation can be a data manipulation language (DML) operation to retrieve and/or manipulate data stored within the database. The database operation can be, for example, one of a select, an insert, an update, and a delete.

The pre-defined threshold can be based on a number of cells implicated by the database operation.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The current subject matter provides many technical advantages. For example, the current subject matter provides techniques for parallelizing database operations for execution by a hierarchy of threads which can help prevent database lock order inversion.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 4 is a second process flow diagram illustrating execution of consistent changes forming part of database operation by a hierarchy of threads.

DETAILED DESCRIPTION

The current subject matter is directed to the processing of consistent changes within databases in order to increase performance In addition, the current subject matter includes a number of aspects that can be applied individually or in combination with various types of database/computing platforms. For example, the current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like), for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Figure 1:
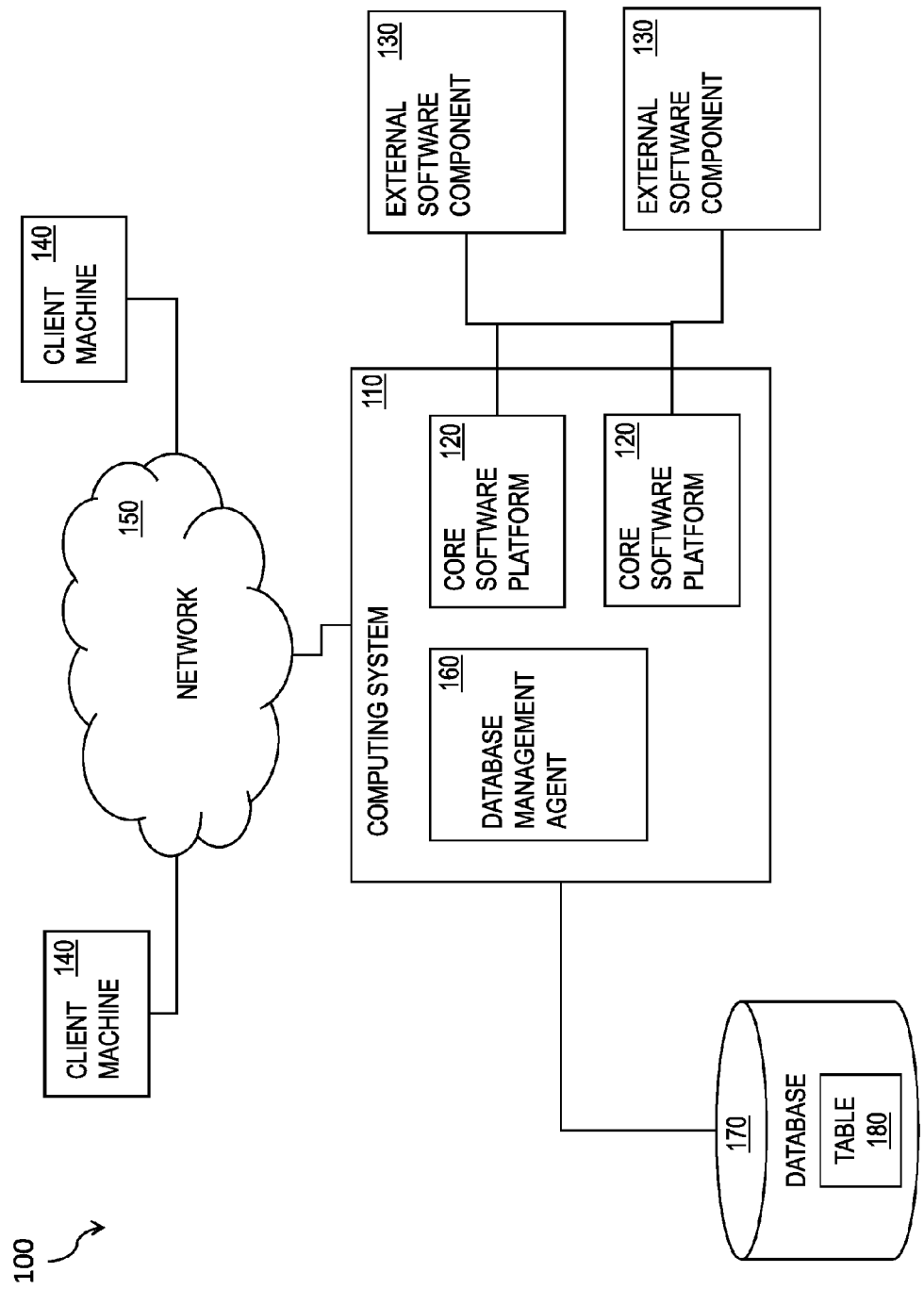
FIG. 1 is a diagram illustrating features of a database system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 (sometimes simply referred to herein as a database 170) that stores and provides access to data (e.g. definitions of business scenarios, business processes, and one or more business configurations as well as data, metadata, master data, etc.) relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
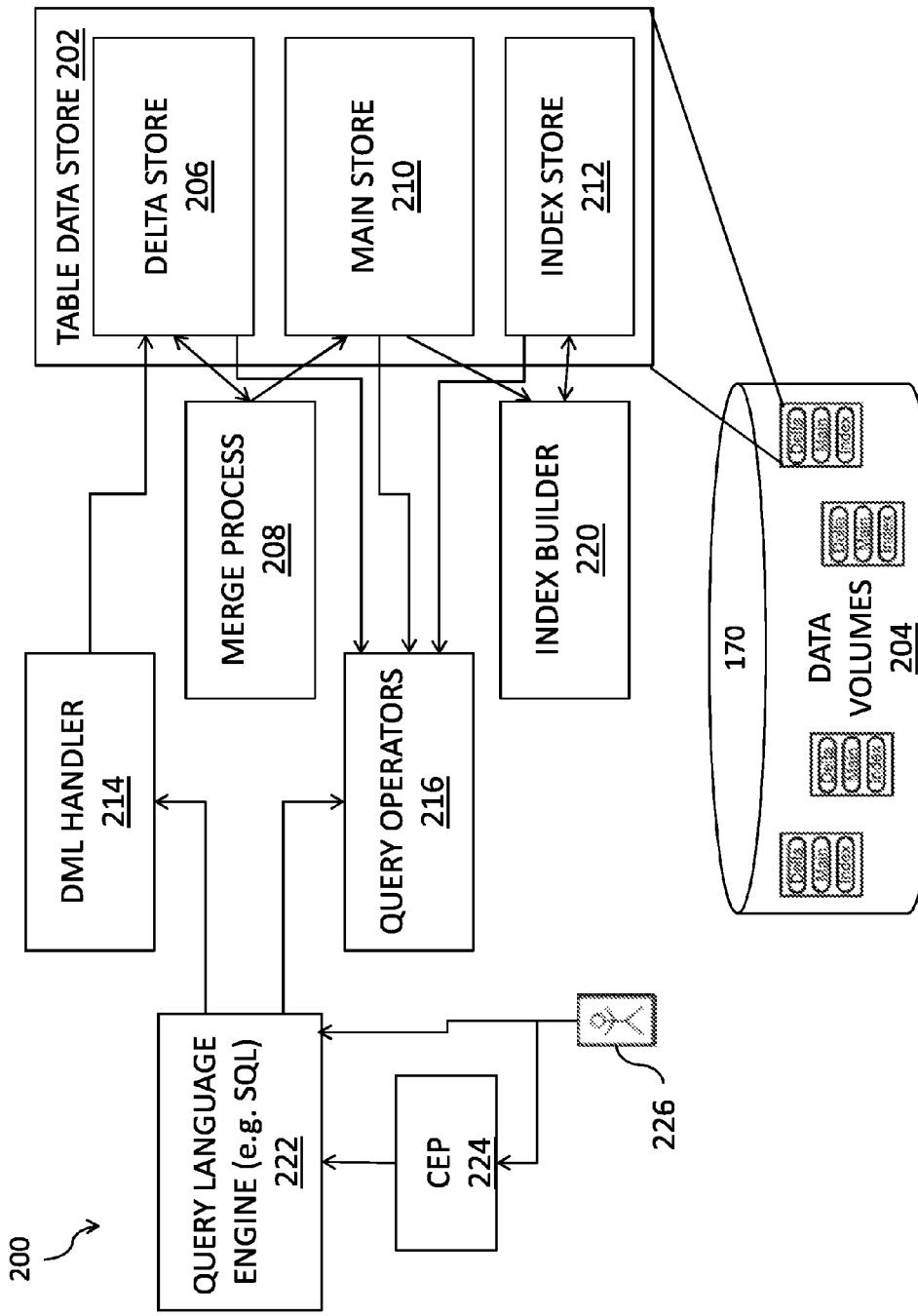
FIG. 2 is another diagram illustrating features of a database system architecture.

FIG. 2 shows a block diagram of an architecture 200 illustrating features that can be included in the database 170. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

The computing system 110 and/or the core software platforms 120 and/or the external software components 130 can execute multithreaded programs. Such multithreaded programs can have threads that concurrently access data structures such as those within the table data store 202. In order to prevent any race/conflict conditions, access to shared structures can be guarded by detecting invalid usage and, in some cases, reporting the conflicting accesses. With some variations, only actual application programming interface (API) functions modifying the shared state needs to be instrumented appropriately to check the contract of the API (as will be described in further detail).

The database 170 can be an in-memory database storing data in a column-oriented fashion that uses mechanisms such as shadow paging to store persistent data on secondary storage such as physical disks. With such arrangements, the location of a page for a given logical page number in secondary storage (e.g., physical page number, etc.) can be stored in a mapping table (which is sometimes referred to a converter). This mapping table can be stored within the database 170 in a similar fashion as a tree of logical pages.

The persistent data is periodically snapshotted or check pointed by the database 170. This process can be referred to as savepoint. Any modification to a logical page in one savepoint cycle will not modify the page in-place, but rather assign new physical location on the secondary storage. Such a logical page modification can also trigger modification of the respective converter page, which can trigger assignment of new physical page for this converter page, which in turn can trigger modification of parent page of this converter page and so on up to converter root page. At savepoint time, all not-yet-flushed modified pages in the database 170 can be stored to the secondary storage, a new anchor page can be written with the new physical root page of the converter and all shadow pages with previous versions of logical and converter pages can be freed for reuse.

Logically, such a model can have two phases: a phase of modification to pages and a savepoint phase during which those modifications are written to secondary storage. To model this, any operations on data need to logically take a shared lock on the shadow paging mechanism and the savepoint needs to take exclusive lock on the shadow paging mechanism. There can be large number pages changed in one savepoint cycle which would make the exclusive lock phase too long. As a result, databases can employ various mechanism to flush pages in advance in background and, instead of waiting for the flushes of remaining pages in a critical phase, the database 170 can create in-memory copies in critical phase and postpone writing the anchor page and freeing old pages until flush of these copies has been done. These processes keep the disruption of normal operations to a minimum.

It will be appreciated that the database 170 is effectively a state machine. To keep the database 170 consistent, these state transitions can be executed atomically. To guarantee this, the database 170 can internally provide consistent change API, which allows grouping of all elementary changes on one or several data pages, logging of the change in a redo log and logging of the inverse change in an undo log. Stated differently, any operations needed for a state transition can be grouped under one consistent change. To ensure that a consistent change is either not contained in a save pointed state at all or it is contained in its entirety, a shared lock on shadow paging mechanism can be (logically) taken as integral part of the consistent change. The savepoint's critical phase can take the exclusive lock on shadow paging mechanism, ensuring that no consistent changes are running at that time which can effectively provide a barrier separating all consistent changes before the savepoint and all consistent changes after the savepoint.

Due to consistent changes taking a shared lock and savepoint's critical phase taking an exclusive lock, consistent changes need to be short so that lock inversion can be avoided. When a savepoint tries to enter critical phase, it will block any further consistent changes from starting. Thus, a long-running consistent change running at the time at the savepoint wants to enter its critical phase would block the savepoint itself from starting critical phase and also all other consistent changes from starting. Another issue is lock inversion: if a lock is taken by a thread which tries to enter a consistent change and another thread already in consistent change tries to take this same lock, a conventional system could deadlock when savepoint tries to enter its critical phase at this time. In general, locks must be taken in same order, otherwise deadlocks will occur.

Consistent changes are conventionally single-threaded. That is, one consistent change protects one thread of execution to do a single change to the database. For database manipulation language (DML) operations this arrangement can result in one long running consistent change, especially if a huge amount of data is processed (e.g., for example, a change involving in excess of a predefined number of cells, etc.) which might block the savepoint and thus other consistent changes from being started. With conventional database, such consistent change groups undo, data, and redo writing for a single statement together with data writing being the most expensive part in some databases such as a column-oriented in-memory database.

To avoid long running consistent changes, the database 170, as provided herein, can (a) split data into chunks of several thousand rows and (b) parallelize a single chunk over several threads. The current subject matter is also directed to consistent changes among several threads are started in an appropriate order to prevent lock inversion.

Figure 3:
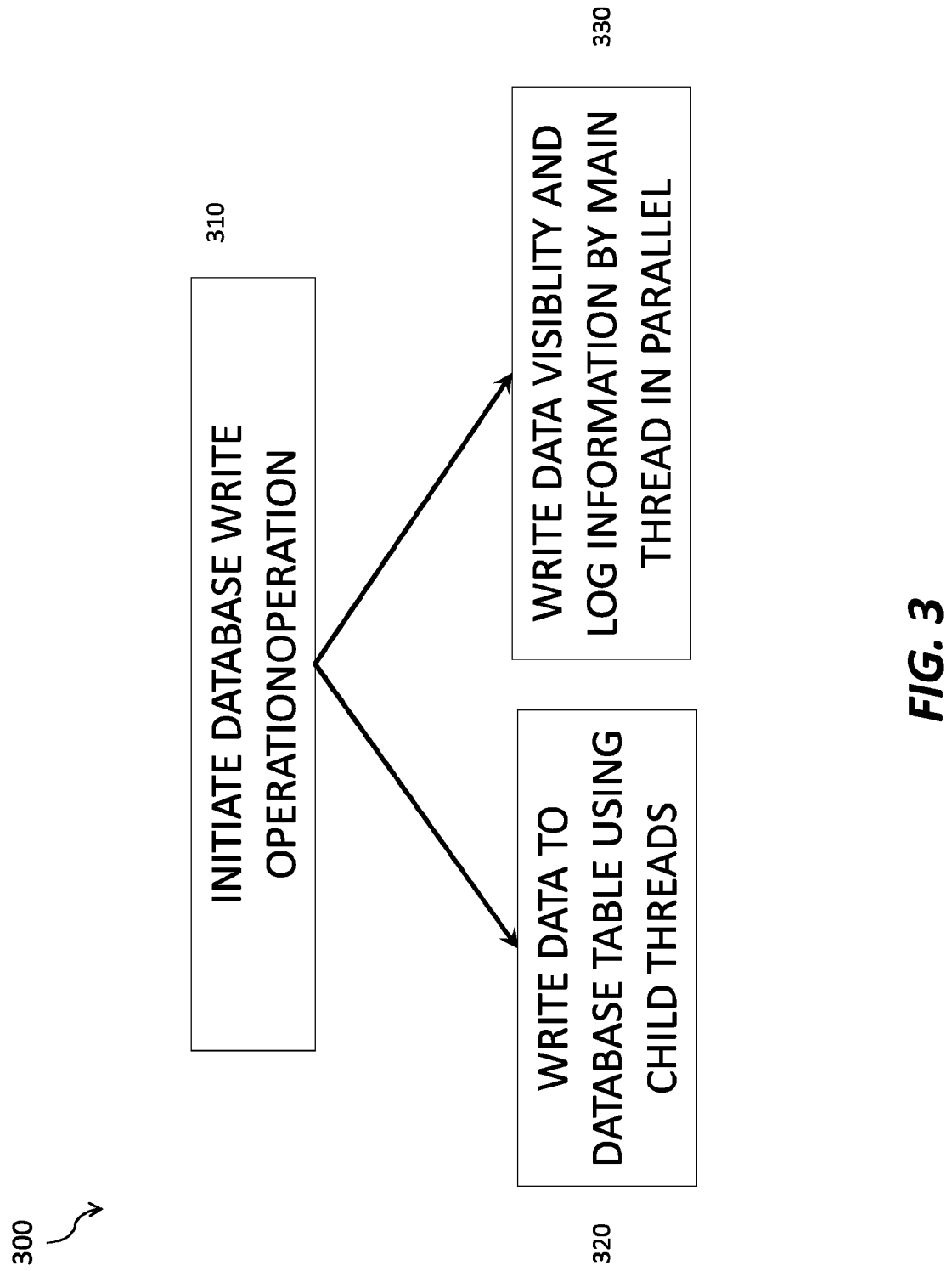
FIG. 3 is a first process flow diagram illustrating execution of consistent changes forming part of database operation by a hierarchy of threads.

FIG. 3 is a process flow diagram 300 showing an example of writing data to database 170. In this case, the database 170 can be a column-oriented in-memory database the writing can be part of a DML operation. With reference again to FIG. 3, at 310, a DML operation to write data is initiated. Subsequently, at 320, data can be written into individual columns of the corresponding database table in the database 170 using several child threads. In addition, in parallel, at 330, data visibility information (i.e., an indication of whether data can be viewed by a particular transaction in order to maintain consistency, etc.) together with log information (e.g., undo and redo log entries) can be written within a main thread. With this arrangement, the threads are hierarchical in that they include a master thread and a plurality of child threads which in turn can have respective child threads and so on. The master thread can coordinate or otherwise monitor the state (e.g., processing, execution, etc.) of the child threads.

Writing data into individual columns of the database 170 does not logically change the database, rather, only writing the visibility information changes it. One particular implementation is shown in diagram 400 of FIG. 4, in which, at 410, a parent thread of a DML operation starts multiple child threads to run in parallel and write data into individual columns of the database 170. Thereafter, at 420, each child thread that writes data into a column starts its own consistent change. After each respective consistent change is started, at 430, each child thread notifies the parent thread of the DML operation and starts writing data into the database 170. After the parent thread has started all its child threads, the parent thread waits for notifications about child nodes entering their respective consistent changes. The parent node then starts its own consistent change, at 440, after receiving all initiation notifications the child nodes. Each child thread then notifies the parent node of the DML operation, at 450, after data is written and the consistent change is closed by the respective child thread. Next, at 460, the parent thread of the DML operation writes data visibility information and undo and redo log entries. The parent thread then, at 470, waits for second notification from all its child threads before it closes its consistent change. It will be appreciated that while the above sequence of operations does not execute all changes to the database 170 in an atomic fashion, the underlying workflow is safe in that it maintains consistency.

Further, if a savepoint enters critical phase before the parent thread's consistent change has been started, but after one or more consistent changes of the parallel child threads have been started, the database 170 can contain additional data in some of the columns. Because no visibility information has been written thus far, the data is not visible. Therefore, the contents of the database 170 did not yet logically change.

After the savepoint, the consistent change of the parent thread will execute, writing visibility information and undo and redo log records. If the database 170 then restarts from this savepoint (which contains additional data in some of the columns of the table), it is still consistent, because the extra data in columns is ignored based on visibility information. Usually, replay of the redo log is executed after the restart. During redo log replay, the previously-stored redo log record of the DML operation is executed. This redo operation will execute the same operations as an online operation, which will simply overwrite already-written data with the data contained in a redo record and finish the DML operation by writing visibility information and an undo log record. Thus, with this arrangement, database 170 is again in consistent state.

For tables having large number of columns or in case the system is already under high load, it is not always meaningful to start as many parallel threads as there are columns In this case fewer child threads than columns will be started such that each child thread can write data to more than one column This arrangement also helps to balance the write operation as some columns might take longer (e.g. only containing distinct values) than others.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim.

What is claimed is:

1. A method for implementation by one or more data processors forming part of at least one computing system, the method comprising:
   initiating a database operation in an in-memory database that stores persistent data in a secondary storage and has at least one associated log, the database operation involving data having a size above a pre-defined threshold;
   splitting the data into a plurality of chunks; and
   executing the database operation by parallelizing each chunk over a plurality of hierarchically arranged threads such that, for each chunk:
      a parent thread causes each of a plurality of child threads to execute a corresponding consistent change;
      the child threads each notify the parent thread when they have started their corresponding consistent change;
      the parent thread starts its own consistent change upon receiving the notifications from all of the child threads that they have started their corresponding consistent change;
      the parent thread, as part of its consistent change, then writes visibility information and undo and redo log entries in the log;
      the child threads each notify the parent thread when they have completed their corresponding consistent change; and
      the parent thread closes its consistent change upon receiving the notifications from all of the child threads that they have completed their corresponding consistent change.

2. The method of claim 1, wherein the in-memory database is a column-oriented in-memory database that stores data tables as sections of columns of data rather than as rows of data.

3. The method of claim 1, wherein there is one child thread per column of data being affected by the database operation.

4. The method of claim 1, wherein there are less than one child thread per column of data being affected by the database operation.

5. The method of claim 1, wherein the database operation is a data manipulation language (DML) operation to retrieve and/or manipulate data stored within the database.

6. The method of claim 5, wherein the database operation is selected from a group consisting of: select, insert, update, and delete.

7. The method of claim 1, wherein the pre-defined threshold is based on a number of cells implicated by the database operation.

8. A system comprising:
   an in-memory database comprising memory and at least one data processor, the memory storing instructions which, when executed by the at least one data processor, result in operations comprising:
      initiating a database operation in the in-memory database that stores persistent data in a secondary storage and has at least one associated log, the database operation involving data having a size above a pre-defined threshold;
      splitting the data into a plurality of chunks; and
      executing the database operation by parallelizing each chunk over a plurality of hierarchically arranged threads.

9. The system of claim 8, wherein, as part of the execution of the database operation, for each chunk:
   a parent thread causes each of a plurality of child threads to execute a corresponding consistent change;
   the child threads each notify the parent thread when they have started their corresponding consistent change;
   the parent thread starts its own consistent change upon receiving the notifications from all of the child threads that they have started their corresponding consistent change;

the parent thread, as part of its consistent change, then writes visibility information and undo and redo log entries in the log;

the child threads each notify the parent thread when they have completed their corresponding consistent change; and the parent thread closes its consistent change upon receiving the notifications from all of the child threads that they have completed their corresponding consistent change.

10. The system of claim 8, wherein the in-memory database is a column-oriented in-memory database that stores data tables as sections of columns of data rather than as rows of data.

11. The system of claim 8, wherein there is one child thread per column of data being affected by the database operation.

12. The system of claim 8, wherein there are less than one child thread per column of data being affected by the database operation.

13. The system of claim 8, wherein the database operation is a data manipulation language (DML) operation to retrieve and/or manipulate data stored within the database.

14. The system of claim 8, wherein the pre-defined threshold is based on a number of cells implicated by the database operation.

15. A non-transitory computer program product storing instructions which, when executed by at least one data processor forming part of at least one computing system, result in operations comprising:

initiating a database operation in an in-memory database that stores persistent data in a secondary storage and has at least one associated log, the database operation involving data having a size above a pre-defined threshold;

splitting the data into a plurality of chunks; and executing the database operation by parallelizing each chunk over a plurality of hierarchically arranged threads.

16. The computer program product of claim 15, wherein, as part of the execution of the database operation, for each chunk:

a parent thread causes each of a plurality of child threads to execute a corresponding consistent change;

the child threads each notify the parent thread when they have started their corresponding consistent change;

the parent thread starts its own consistent change upon receiving the notifications from all of the child threads that they have started their corresponding consistent change;

the parent thread, as part of its consistent change, then writes visibility information and undo and redo log entries in the log;

the child threads each notify the parent thread when they have completed their corresponding consistent change; and the parent thread closes its consistent change upon receiving the notifications from all of the child threads that they have completed their corresponding consistent change.

17. The computer program product of claim 16, wherein the in-memory database is a column-oriented in-memory database that stores data tables as sections of columns of data rather than as rows of data.

18. The computer program product of claim 17, wherein there is one child thread per column of data being affected by the database operation.

19. The computer program product of claim 17, wherein there are less than one child thread per column of data being affected by the database operation.

20. The computer program product of claim 16, wherein the database operation is a data manipulation language (DML) operation to retrieve and/or manipulate data stored within the database.

* * * * *